US011410060B1

(12) United States Patent
Moore et al.

(10) Patent No.: US 11,410,060 B1
(45) Date of Patent: *Aug. 9, 2022

(54) SYSTEM AND METHOD FOR UTILIZING A LOGICAL GRAPHICAL MODEL FOR SCENARIO ANALYSIS

(71) Applicant: BULLET POINT NETWORK, L.P., San Mateo, CA (US)

(72) Inventors: Peter Moore, San Mateo, CA (US); Andrey Pleshakov, San Mateo, CA (US)

(73) Assignee: BULLET POINT NETWORK, L.P., San Mateo, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 16/174,224

(22) Filed: Oct. 29, 2018

Related U.S. Application Data

(63) Continuation of application No. 14/738,690, filed on Jun. 12, 2015, now Pat. No. 10,115,059.

(60) Provisional application No. 62/012,184, filed on Jun. 13, 2014.

(51) Int. Cl.
  *G06N 5/04* (2006.01)
  *H04L 12/413* (2006.01)

(52) U.S. Cl.
  CPC .......... *G06N 5/048* (2013.01); *H04L 12/413* (2013.01)

(58) Field of Classification Search
  CPC .......... G06N 5/048; G06N 7/005; G06N 7/06; G06N 7/02; H04L 12/413
  USPC ............................................. 706/52, 14, 45
  See application file for complete search history.

(56) References Cited

U.S. PATENT DOCUMENTS

| | | | | |
|---|---|---|---|---|
| 5,933,818 A * | 8/1999 | Kasravi | ................... | G06N 3/126 706/12 |
| 6,408,290 B1 * | 6/2002 | Thiesson | ............... | G06K 9/6296 706/52 |
| 6,556,960 B1 * | 4/2003 | Bishop | ................... | G06F 17/18 700/28 |
| 7,720,779 B1 * | 5/2010 | Perry | ....................... | G06N 5/04 706/45 |
| 2007/0011113 A1 * | 1/2007 | Mosleh | .................. | G06N 7/005 706/14 |
| 2009/0012842 A1 * | 1/2009 | Srinivasan | .............. | G06F 40/30 705/12 |
| 2009/0303239 A1 * | 12/2009 | Ang | ....................... | G06F 16/248 345/440 |
| 2011/0040721 A1 * | 2/2011 | Mihalkova | .......... | G06F 16/2465 706/52 |
| 2012/0158636 A1 * | 6/2012 | Bowers | .................... | G06N 5/02 706/50 |

(Continued)

OTHER PUBLICATIONS

Kevin Murphy, Software Packages for Graphical Models, dated Jun. 16, 2014; retrieved from: https://www.cs.ubc.ca/~rnurphyk/Software/bnsoft.htrnl (2 pgs.).

(Continued)

*Primary Examiner* — Dave Misir
(74) *Attorney, Agent, or Firm* — Manatt, Phelps & Phillips, LLP

(57) ABSTRACT

A system and method for utilizing a logical graphical model for data analysis are described. The system provides a "PGM authoring tool" that enables a user to employ a logical graphical model to create, edit, and browse the assertions and inferences in a probabilistic graphical model.

18 Claims, 21 Drawing Sheets

(56) References Cited

U.S. PATENT DOCUMENTS

| | | | | |
|---|---|---|---|---|
| 2012/0296941 A1* | 11/2012 | Cao | ............ | G06F 16/435 707/802 |
| 2013/0185232 A1* | 7/2013 | Hochstein | ............ | G06N 7/005 706/12 |
| 2013/0325787 A1* | 12/2013 | Gerken | ............ | G06N 5/048 706/52 |
| 2014/0250045 A1* | 9/2014 | Bounouane | ............ | G06F 40/279 706/52 |

OTHER PUBLICATIONS

W3C, SPARQL Query Language for RDF, dated Jan. 15, 2008; retrieved from: http://www.w3.org/TR/rdf-sparql-query (72 pgs.).

W3C, Resource Description Framework (RDF): Concepts and Abstract Syntax; retrieved from: http://www.w3.org/TR/rdf-concepts/ (21 pgs.).

W3C, OWL 2 Web Ontology Language Profiles, dated Oct. 27, 2009; retrieved from: http://www.w3.org/TR/2009/REC-owl2-profiles-20091027/ (43 pgs.).

W3C, SPARQL 1.1 Federated Query, dated Mar. 31, 2013: retrieved from http://www.w3.org/TR/2013/REC-sparql11-federated-query-20130321 / (12 pgs.).

Protege tabular graph editor authoring tool; retrieved from http://protege.stanford.edu/ (2 pgs.).

Anonymous, Wikipedia: Probabilistic logic; retrieved from https://en.wikipedia.org/wiki/Probabilistic_logic (5 pgs.).

Anonymous—Wikipedia: Probabilistic logic network; retrieved from https//en.wikipedia.org/wiki/Probabilistic_logic_network (2 pgs.).

Domingos, Webb, ITHS A tractable first-order probabilistic logic, retrieved https://iths.pure.elsevier.com/en/publications/a-tractable-first-order-probabilistic-logic (3 pgs.).

PR-OWL: A Bayesian extension to the OWL Ontology Language: retrieved from http://www.pr-owl.org/ (3 pgs.).

* cited by examiner

| Scenario | Probability |
|---|---|
| Company B does NOT sign large deal to buy CPUs from Company A in 2015 | 20% |
| Company B DOES sign large deal to buy CPUs from Company A in 2015 | 80% |

FIGURE 3

| Scenario | Condition | Probability |
|---|---|---|
| Company A does NOT sign deal to buy desktop PCs from Company B in 2016 | Company B does NOT sign large deal to buy CPUs from Company A in 2015 | 50% |
| | Company B DOES sign large deal to buy CPUs from Company A in 2015 | 10% |
| Company A DOES sign deal to buy desktop PCs from Company B in 2016 | Company B does NOT sign large deal to buy CPUs from Company A in 2015 | 50% |
| | Company B DOES sign large deal to buy CPUs from Company A in 2015 | 90% |

FIGURE 4

| Variable | Assertion about its Scenarios or Factor |
|---|---|
| Company B desktop PC 2015 unit sales | 50M |
| Company B desktop PC 2016 unit sales | 45M |
| Company B notebook PC 2015 unit sales | 100M |
| Company B notebook PC 2016 unit sales | 105M |
| Company B desktop PC 2015 ASP | $1,000 |
| Company B desktop PC 2016 ASP | $950 |
| Company B notebook PC 2015 ASP | $2,000 |
| Company B notebook PC 2016 ASP | $1,900 |
| Company B desktop PC 2015 revenue | Company B desktop PC 2015 unit sales * Company B desktop PC 2015 ASP |
| Company B desktop PC 2016 revenue | Company B desktop PC 2016 unit sales * Company B desktop PC 2016 ASP |
| Company B notebook PC 2015 revenue | Company B notebook PC 2015 unit sales * Company B notebook PC 2015 ASP |
| Company B notebook PC 2016 revenue | Company B notebook PC 2016 unit sales * Company B notebook PC 2016 ASP |

FIGURE 5

| Variable | product | Time | Assertion about its Scenarios or Factor |
|---|---|---|---|
| Company B unit sales | Desktop PC | 2015 | 50M |
| | Desktop PC | 2016 | 45M |
| | Notebook PC | 2015 | 100M |
| | Notebook PC | 2016 | 105M |
| Company B ASP | Desktop PC | 2015 | $1,000 |
| | Desktop PC | 2016 | $950 |
| | Notebook PC | 2015 | $2,000 |
| | Notebook PC | 2016 | $1,900 |
| Company B revenue | | | Company B unit sales * Company B ASP |

FIGURE 6

| Refresh Table \| Edit \| Save Table Settings \| Normalize \| Fill in Missing | | | | | |
|---|---|---|---|---|---|
| ▽ PRODUCT | SELLER | BUYER | TIME | VARIABLE | VALUE |
| ⊟ ELECTRONIC DEVICE | THING | THING | THING | THING | THING |
| CPU | COMPANY A | COMPANY B | ⊟ THING | THING | THING |
| | | | CY2010 | USD SALES OF CPUs BY COMPANY A TO COMPANY B IN 2010 | THING |
| | | | CY2015 | ⊟ COMPANY B SIGNS LARGE DEAL TO BUY CPUs FROM COMPANY A IN 2015? | THING |
| | | | | COMPANY B DOES NOT SIGN LARGE DEAL TO BUY CPUs FROM COMPANY A IN 2015 | NO |
| | | | | COMPANY B DOES SIGN LARGE DEAL TO BUY CPUs FROM COMPANY A IN 2015 | YES |
| ⊟ PC | THING | THING | THING | THING | THING |
| DESKTOP PC | COMPANY B | COMPANY A | CY 2011 | USD SALES OF DESKTOP PCs BY COMPANY B TO COMPANY A IN 2011 | THING |
| NOTEBOOK PC | COMPANY B | COMPANY A | CY 2011 | USD SALES OF NOTEBOOK PCs BY COMPANY B TO COMPANY A IN 2011 | THING |

FIGURE 10

NAME: COMPANY B DOES SIGN LARGE DEAL TO BUY CPUs FROM COMPANY A IN 2015

ATTRIBUTES

*IS A* COMPANY B SIGNS LARGE DEAL TO BUY CPUs FROM COMPAN...
*VALUE* YES
*BUYER* COMPANY B
*PRODUCT* CPU
*SELLER* COMPANY A
*TIME* CY 2015

FIGURE 11

⊟ AV. YEARS FROM 2015 TO 2016
   ├→ 1. CY2015
   └→ 2. CY2016
⊟ AW. PC INDEX OBJECTS
   ├→ 1. NOTEBOOK PC
   └→ 2. DESKTOP PC

FIGURE 12

| PRODUCT | SELLER | BUYER | TIME | VARIABLE | VALUE |
|---|---|---|---|---|---|
| ⊟ ELECTRONIC DEVICE | THING | THING | THING | THING | THING |
| CPU | COMPANY A | COMPANY B | ⊟ THING | THING | THING |
| | | | CY2010 | USD SALES OF CPUs BY COMPANY A TO COMPANY B IN 2010 | THING |
| | | | CY2015 | ⊟ COMPANY B SIGNS LARGE DEAL TO BUY CPUs FROM COMPANY A IN 2015? | THING |
| | | | | COMPANY B DOES NOT SIGN LARGE DEAL TO BUY CPUs FROM COMPANY A IN 2015 | NO |
| | | | | COMPANY B DOES SIGN LARGE DEAL TO BUY CPUs FROM COMPANY A IN 2015 | YES |
| ⊟ PC | THING | THING | THING | THING | THING |
| PC INDEX OBJECTS | COMPANY B | THING | YEARS FROM 2015 TO 2016 | COMPANY B UNIT SALES | THING |
| DESKTOP PC | COMPANY B | COMPANY A | CY 2011 | USD SALES OF DESKTOP PCs BY COMPANY B TO COMPANY A IN 2011 | THING |
| NOTEBOOK PC | COMPANY B | COMPANY A | CY 2011 | USD SALES OF NOTEBOOK PCs BY COMPANY B TO COMPANY A IN 2011 | THING |

FIGURE 13

| | | | | | |
|---|---|---|---|---|---|
| NAME: | COMPANY B UNIT SALES AND PRODUCT DESKTOP PC AND TIME CY 2015 | | | | |

| ATTRIBUTES | |
|---|---|
| IS A   COMPANY B UNIT SALES AND PRODUCT DESKTOP PC | INDEX |
| PRODUCT   DESKTOP PC | INDEX |
| TIME   CY2015 | INDEX |
| INDEXED BY   PRODUCT PC INDEX OBJECTS | |
| INDEXED BY TIME   YEARS FROM 2015 TO 2016 | |
| SELLER   COMPANY B | |

FIGURE 14

| PRODUCT | SELLER | BUYER | TIME | VARIABLE | VALUE |
|---|---|---|---|---|---|
| ELECTRONIC DEVICE | THING | THING | THING | THING | THING |
| CPU | COMPANY A | COMPANY B | THING | THING | THING |
| | | | CY2010 | USD SALES OF CPUs BY COMPANY A TO COMPANY B IN 2010 | THING |
| | | | CY2015 | COMPANY B SIGNS LARGE DEAL TO BUY CPUs FROM COMPANY A IN 2015? | THING |
| | | | | COMPANY B DOES NOT SIGN LARGE DEAL TO BUY CPUs FROM COMPANY A IN 2015 | NO |
| | | | | COMPANY B DOES SIGN LARGE DEAL TO BUY CPUs FROM COMPANY A IN 2015 | YES |
| PC | THING | THING | THING | THING | THING |
| DESKTOP PC | COMPANY B | THING | YEARS FROM 2015 TO 2016 | COMPANY B UNIT SALES AND PRODUCT DESKTOP PC AND TIME 2015 | THING |
| | | | CY2015 | COMPANY B UNIT SALES AND PRODUCT DESKTOP PC AND TIME CY2015 | THING |
| | | | CY2016 | COMPANY B UNIT SALES AND PRODUCT DESKTOP PC AND TIME CY2016 | THING |
| | | COMPANY A | CY2011 | USD SALES OF DESKTOP PCs BY COMPANY B TO COMPANY A IN 2011 | THING |
| NOTEBOOK PC | COMPANY B | THING | YEARS FROM 2015 TO 2016 | COMPANY B UNIT SALES AND PRODUCT NOTEBOOK PC | THING |
| | | | CY2015 | COMPANY B UNIT SALES AND PRODUCT NOTEBOOK PC AND TIME CY2015 | THING |
| | | | CY2016 | COMPANY B UNIT SALES AND PRODUCT NOTEBOOK PC AND TIME CY2016 | THING |
| | | COMPANY A | CY2011 | USD SALES OF NOTEBOOK PCs BY COMPANY B TO COMPANY A IN 2011 | THING |

FIGURE 15

| ▽ SCENARIOS | CONDITIONAL ON | JUDGMENT | INCREMENTAL CONFIDENCE | SUPPORTED BY: DURING | SUPPORTED BY: AUTHOR.ORG | SUPPORTED BY: AUTHOR PERSON | SUPPORTED BY |
|---|---|---|---|---|---|---|---|
| COMPANY B SIGNS LARGE DEAL TO BUY CPUs FROM COMPANY A IN 2015? | | | | | | | |

FIGURE 16

| ▽ SCENARIOS | CONDITIONAL ON | JUDGMENT | INCREMENTAL CONFIDENCE | SUPPORTED BY: DURING | SUPPORTED BY: AUTHOR.ORG | SUPPORTED BY: AUTHOR PERSON | SUPPORTED BY |
|---|---|---|---|---|---|---|---|
| COMPANY B SIGNS LARGE DEAL TO BUY CPUs FROM COMPANY A IN 2015? | | | | | | | |

- ⇩ ADD OUTGOING ▸
- ⇩ ADD INCOMING ▸  IS A
- ⇩ UPDATE SCENARIOS  0 SCENARIOS
- ⊖ COLLAPSE LINKS  0 USER ORDERING VALUE

FIGURE 17

| ▽ SCENARIOS | CONDITIONAL ON | JUDGMENT | INCREMENTAL CONFIDENCE | SUPPORTED BY: DURING | SUPPORTED BY: AUTHOR.ORG | SUPPORTED BY: AUTHOR PERSON | SUPPORTED BY |
|---|---|---|---|---|---|---|---|
| ⊖ COMPANY B SIGNS LARGE DEAL TO BUY CPUs FROM COMPANY A IN 2015? | | | | | | | SUPPORTED BY LINK |
| ⊟ IS A | | | | | | | |
| COMPANY B DOES NOT SIGN LARGE DEAL TO BUY CPUs FROM COMPANY A IN 2015 | 20% | 50% | 11/12/2013 | METROPOLIS TIMES | LOIS DOE | THE RUMOR MILL SAYS THAT COMPANY A IS GOING TO BUY CPUs FROM COMPANY C IN A YEAR OR TWO. | |
| COMPANY B DOES SIGN LARGE DEAL TO BUY CPUs FROM COMPANY A IN 2015 | 80% | 50% | 9/20/2013 | COMPANY A | JOHN DOE | WE HAVE SIGNED A DEAL WITH COMPANY B EVERY ONE OF THE LAST 5 YEARS. | ☒ |

FIGURE 18

| SCENARIOS:IS A | COMPANY B SIGNS LARGE DEAL TO BUY CPUs FROM COMPANY A IN 2015? | |
|---|---|---|
| ◇ SCENARIOS:VALUE | NO | YES |
| JUDGMENT | 20% | 80% |

FIGURE 19

| SCENARIOS | CONDITIONAL ON | JUDGMENT | INCREMENTAL CONFIDENCE | SUPPORTED BY: DURING | SUPPORTED BY: AUTHOR.ORG | SUPPORTED BY: AUTHOR.PERSON | SUPPORTED BY: / SUPPORTED BY LINK |
|---|---|---|---|---|---|---|---|
| ⊟ COMPANY A SIGNS DEAL TO BUY DESKTOP PCs FROM COMPANY B IN 2016? | | | | | | | |
| ⊟ IS A | | | | | | | |
| COMPANY A DOES NOT SIGN LARGE DEAL TO BUY CPUs FROM COMPANY B IN 2016 | COMPANY B DOES NOT SIGN LARGE DEAL TO BUY CPUs FROM COMPANY A IN 2015 | 50% | 80% | 11/12/2015 | METROPOLIS TIMES | LOIS DOE | IT IS QUITE CLEAR THAT IF COMPANY B DOES NOT BUY CPUs FROM COMPANY A, THEN COMPANY A WILL RETALIATE BY DECLINING TO BUY ITS PCs FROM COMPANY B |
| | COMPANY B DOES SIGN LARGE DEAL TO BUY CPUs FROM COMPANY A IN 2016 | 10% | 80% | | | | |
| COMPANY A DOES SIGN DEAL TO BUY DESKTOP PCs FROM COMPANY B IN 2016 | COMPANY B DOES NOT SIGN LARGE DEAL TO BUY CPUs FROM COMPANY A IN 2015 | 50% | 80% | | | | |
| | COMPANY B DOES SIGN LARGE DEAL TO BUY CPUs FROM COMPANY A IN 2015 | 90% | 80% | 11/12/2015 | METROPOLIS TIMES | LOIS DOE | COMPANY A ALLEGEDLY DOES LIKE COMPANY B'S PCs BETTER THAN THE COMPETITORS' PCs |

FIGURE 20

| ▽ SCENARIOS:IS A: | COMPANY A SIGNS DEAL TO BUY DESKTOP PCs FROM COMPANY B IN 2015? | | |
|---|---|---|---|
| CONDITIONAL ON | SCENARIOS.VALUE | NO | YES |
| COMPANY B DOES NOT SIGN LARGE DEAL TO BUY CPUs FROM COMPANY A IN 2015 | JUDGMENT | 50% | 50% |
| COMPANY B DOES SIGN LARGE DEAL TO BUY CPUs FROM COMPANY A IN 2015 | JUDGMENT | 10% | 90% |

FIGURE 21

| SCENARIOS:IS A: | COMPANY A SIGNS DEAL TO BUY DESKTOP PCs FROM COMPANY B IN 2015? | | |
|---|---|---|---|
| CONDITIONAL ON:IS A: | COMPANY B SIGNS LARGE DEAL TO BUY DESKTOP CPUs FROM COMPANY A IN 2015? | | |
| CONDITIONAL ON:VALUE | ▽ SCENARIOS:VALUE | NO | YES |
| NO | JUDGMENT | 50% | 50% |
| YES | JUDGMENT | 10% | 90% |

FIGURE 22

| ♦ SCENARIOS:IS A: | COMPANY B ASP | | |
|---|---|---|---|
| SCENARIOS PRODUCT | ▽ SCENARIOS: TIME | CY2015 | CY2016 |
| DESKTOP PC | JUDGMENT | NORMAL (1000, 10) | NORMAL (950, 10) |
| NOTEBOOK PC | JUDGMENT | NORMAL (2000, 15) | NORMAL (1900, 20) |

| ♦ SCENARIOS:IS A: | COMPANY B UNIT SALES | | |
|---|---|---|---|
| SCENARIOS PRODUCT | ♦ SCENARIOS: TIME | CY2015 | CY2016 |
| DESKTOP PC | JUDGMENT | NORMAL (50M, 2M) | DESKTOP SALES AFTER COMPANY A DEAL GO OR NO-GO |
| NOTEBOOK PC | JUDGMENT | NORMAL (100M, 3M) | NORMAL (105M, 10M) |

FIGURE 23

| ▽ SCENARIOS | CONDITIONAL ON | JUDGMENT | INCREMENTAL CONFIDENCE | SUPPORTED BY: DURING | SUPPORTED BY AUTHOR.ORG | SUPPORTED AUTHOR PERSON | SUPPORTED BY | SUPPORTED BY LINK |
|---|---|---|---|---|---|---|---|---|
| DESKTOP SALES AFTER COMPANY A DEAL GO OR NO-GO | COMPANY A DOES NOT SIGN DEAL TO BUY DESKTOP PCs FROM COMPANY B IN 2016 | NORMAL (30M, 1M) | 90% | 11/12/2013 | METROPOLIS TIMES | LOIS DOE | | COMPANY B'S DESKTOP PC SALES MAY DECLINE 15 MILLION UNITS IF COMPANY A DOESN'T SIGN A CONTRACT |
| | COMPANY A DOES SIGN DEAL TO BUY DESKTOP PCs FROM COMPANY B IN 2016 | NORMAL (45M, 3M) | 90% | 11/12/2013 | METROPOLIS TIMES | LOIS DOE | | COMPANY B'S DESKTOP PC SALES MAY DECLINE 15 MILLION UNITS IF COMPANY A DOESN'T SIGN A CONTRACT |
| | | | | | | | | COMPANY B'S DESKTOP PC SALES WILL PROBABLY DECLINE 10% OVERALL IF ITS CUSTOMERS STAY THE SAME |

FIGURE 24

| ▽ SCENARIOS | CONDITIONAL ON | JUDGMENT | INCREMENTAL CONFIDENCE | SUPPORTED BY: DURING | SUPPORTED BY AUTHOR.ORG | SUPPORTED AUTHOR PERSON | SUPPORTED BY | SUPPORTED BY LINK |
|---|---|---|---|---|---|---|---|---|
| COMPANY B REVENUE | | COMPANY B UNIT SALES * COMPANY B ASP | | | | | | |

| SCENARIOS | CONDITIONAL ON | JUDGMENT | INCREMENTAL CONFIDENCE | SUPPORTED BY: DURING | SUPPORTED BY AUTHOR ORG | SUPPORTED BY AUTHOR PERSON | SUPPORTED BY | SUPPORTED BY LINK |
|---|---|---|---|---|---|---|---|---|
| COMPANY B REVENUE ⇐INFLUENCED BY COMPANY B ASP | | COMPANY B UNIT SALES × COMPANY B ASP | | | | | | |
| ⊙ COMPANY B UNIT SALES | | | | | | | | |
| ⇐INFLUENCED BY | | | | | | | | |
| DESKTOP SALES AFTER COMPANY A DEAL GO OR NO-GO | COMPANY A DOES NOT SIGN DEAL TO BUY DESKTOP PCs FROM COMPANY B IN 2016 | NORMAL (30M, 1M) | 90% | 11/12/2013 | METROPOLIS TIMES | LOIS DOE | COMPANY B'S DESKTOP PC SALES MAY DECLINE 15 MILLION UNITS IF COMPANY A DOES NOT SIGN A CONTRACT | |
| | COMPANY A DOES SIGN DEAL TO BUY DESKTOP PCs FROM COMPANY B IN 2016 | NORMAL (45M, 3M) | 90% | 11/12/2013 | METROPOLIS TIMES | LOIS DOE | COMPANY B'S DESKTOP PC SALES MAY DECLINE 15 MILLION UNITS IF COMPANY A DOES NOT SIGN A CONTRACT | |
| | | | | | | | COMPANY B'S DESKTOP PC SALES WILL PROBABLY DECLINE 10% OVERALL IF ITS CUSTOMERS STAY THE SAME | |
| ⇐INFLUENCED BY | | | | | | | | |
| ⊙ COMPANY A SIGNS DEAL TO BUY DESKTOP PCs FROM COMPANY B IN 2016? | | | | | | | | |
| ⇐INFLUENCED BY | | | | | | | | |
| ⊙ COMPANY B SIGNS LARGE DEAL TO BUY CPUs FROM COMPANY A IN 2015? | | | | | | | | |
| ⊙ Q15 A | | | | | | | | |
| COMPANY B DOES NOT SIGN LARGE DEAL TO BUY CPUs FROM COMPANY A IN 2015 | | 20% | 50% | 11/12/2013 | METROPOLIS TIMES | LOIS DOE | THE RUMOR MILL SAYS THAT COMPANY A IS GOING TO BUY CPUs FROM COMPANY C IN A YEAR OR TWO | |
| COMPANY B DOES SIGN LARGE DEAL TO BUY CPUs FROM COMPANY A IN 2015 | | 80% | 50% | 9/20/2013 | COMPANY A | JOE DOE | WE HAVE SIGNED A DEAL WITH COMPANY B EVERY ONE OF THE LAST 5 YEARS. | |

FIGURE 28

| IS A | COMPANY B REVENUE AND PRODUCT DESKTOP PC AND TIME... | RESULT ⊖ |
|---|---|---|
| PERCENTILE 01% | | RESULT ⊖ |
| VALUE 27.49B | | RESULT ⊖ |

FIGURE 29

| IS A: | COMPANY B REVENUE | PERCENTILE: | 50% |
|---|---|---|---|
| ▽ PRODUCT | ▽ TIME | 2015 | 2016 |
| DESKTOP PC | VALUE | 49.96B | 41.62B |
| NOTEBOOK PC | VALUE | 200.5B | 199.6B |

FIGURE 30

| ▽ IS A | CONFIDENCE | ▽ PERCENTILE | 01% | 10% | 25% | 50% | 75% | 90% | 95% |
|---|---|---|---|---|---|---|---|---|---|
| COMPANY B REVENUE AND PRODUCT DESKTOP PC AND TIME 2015 | 51% | VALUE | 45.76B | 47.71B | 48.62B | 49.96B | 51.42B | 52.47B | 55.05B |
| COMPANY B REVENUE AND PRODUCT DESKTOP PC AND TIME 2016 | 23% | VALUE | 27.49B | 28.50B | 39.01B | 41.62B | 43.92B | 45.68B | 49.55B |

FIGURE 31

| ▽ IS A | CONFIDENCE | ▽ PERCENTILE | 01% | 10% | 25% | 50% | 75% | 90% | 95% |
|---|---|---|---|---|---|---|---|---|---|
| ⊞ COMPANY B REVENUE AND PRODUCT DESKTOP PC AND TIME 2015 | 51% | VALUE | 45.76B | 47.71B | 48.62B | 49.96B | 51.42B | 52.47B | 55.05B |
| ⊟ INFLUENCED BY | | | | | | | | | |
| COMPANY B ASP AND PRODUCT DESKTOP PC AND TIME 2015 | 80% | VALUE | 978.3 | 987.4 | 999.3 | 1000 | 1007 | 1013 | 1022 |
| COMPANY B UNIT SALES AND PRODUCT DESKTOP PC AND TIME 2015 | 80% | VALUE | 45.65M | 47.42M | 48.67M | 50.00M | 51.33M | 52.52M | 54.35 |
| ⊞ COMPANY B REVENUE AND PRODUCT DESKTOP PC AND TIME 2016 | 23% | VALUE | 27.49B | 28.50B | 39.01B | 41.62B | 43.92B | 45.89B | 49.56B |
| ⊟ INFLUENCED BY | | | | | | | | | |
| COMPANY B ASP AND PRODUCT DESKTOP PC AND TIME 2016 | 80% | VALUE | 928.3 | 937.4 | 945.3 | 950.0 | 956.7 | 962.6 | 971.7 |
| ⊞ DESKTOP SALES AFTER COMPANY A DEAL GO OR NO-GO | 36% | VALUE | 29.14M | 30.14M | 40.83M | 43.64M | 46.22M | 48.19M | 51.52M |
| ⊟ INFLUENCED BY | | | | | | | | | |
| ⊞ COMPANY A SIGNS DEAL TO BUY DESKTOP PCs FROM COMPANY B IN 2016? | 40% | VALUE | YES | YES | YES | YES | YES | NO | NO |
| ⊟ INFLUENCED BY | | | | | | | | | |
| COMPANY B SIGNS LARGE DEAL TO BUY CPUs FROM COMPANY A IN 2015? | 50% | VALUE | YES | YES | YES | YES | YES | NO | NO |

FIGURE 32

| ▽ IS A | ▽ PRODUCT | TIME | 2015 | | | 2016 | | |
|---|---|---|---|---|---|---|---|---|
| | | PERCENTILE | 10% | 50% | 90% | 10% | 50% | 90% |
| COMPANY B TOTAL REVENUE | | VALUE | 240.9B | 250.5B | 257.9B | 213.9B | 238.8B | 267.0B |
| INFLUENCED BY | | VALUE | | | | | | |
| COMPANY B REVENUE BY PRODUCT | DESKTOP PC | VALUE | 47.05B | 49.95B | 52.51B | 29.64B | 42.13B | 45.77B |
| | NOTEBOOK PC | VALUE | 191.8B | 200.2B | 207.6B | 174.2B | 199.2B | 224.0B |
| INFLUENCED BY | | VALUE | | | | | | |
| COMPANY B ASP BY PRODUCT | DESKTOP PC | VALUE | 987.4 | 1,000 | 1,013 | 937.4 | 950.0 | 962.6 |
| | NOTEBOOK PC | VALUE | 1,981 | 2,000 | 2,019 | 1,875 | 1,900 | 1,925 |
| COMPANY B UNIT SALES BY PRODUCT | DESKTOP PC | VALUE | 47.48M | 50.00M | 52.52M | 31.34M | 44.24M | 46.19M |
| | NOTEBOOK PC | VALUE | 96.22M | 100.0M | 103.8M | 92.41M | 105.0M | 117.6M |
| INFLUENCED BY | | VALUE | | | | | | |
| DESKTOP SALES AFTER COMPANY A DEAL GO OR NO-GO | DESKTOP PC | VALUE | | | | 31.34M | 44.24M | 46.18M |
| INFLUENCED BY | | VALUE | | | | | | |
| COMPANY A SIGNS DEAL TO BUY DESKTOP PCs FROM COMPANY B IN 2016? | DESKTOP PC | VALUE | | | | NO | YES | YES |
| INFLUENCED BY | | VALUE | | | | | | |
| COMPANY B SIGNS LARGE DEAL TO BUY CPUs FROM COMPANY A IN 2015? | CPU | VALUE | YES | YES | NO | | | |

FIGURE 33

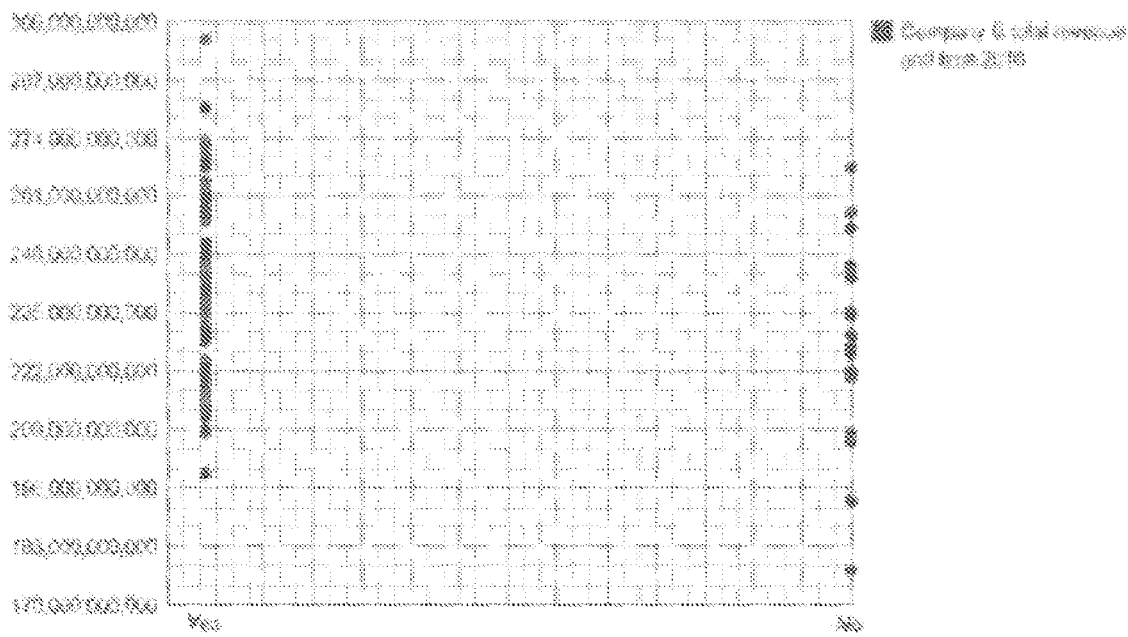

FIGURE 34

SYSTEM AND METHOD FOR UTILIZING A LOGICAL GRAPHICAL MODEL FOR SCENARIO ANALYSIS

PRIORITY CLAIM

This application claims priority under 35 USC 120 and is a continuation of U.S. patent application Ser. No. 14/738,690, filed on Jun. 12, 2015 entitled "System And Method For Utilizing A Logical Graphical Model For Scenario Analysis" that is turns claims the benefit under 35 USC 120 and 119(e) to U.S. Provisional Patent Application Ser. No. 62/012,184, filed on Jun. 13, 2014 and entitled "Utilizing a Logical Graphical Model to Define a Probabilistic Graphical Model", the entirety of both of which are incorporated herein by reference.

FIELD

The disclosure relates generally to a system and method for data analysis and in particular to a system and method for data analysis using a logical graphical model.

BACKGROUND

People often build models to help them plan for an uncertain future. In business, computer spreadsheets are a common tool for modeling, but with spreadsheets, people struggle to represent multiple scenarios and to represent how scenarios for any one variable, such as future profit for a company, may be related to scenarios for multiple other variables, such as future sales of multiple products like desktop PCs and notebook PCs in multiple regions like North America and Europe, and how scenarios for those variables in turn may be related to scenarios for other variables, such as the introduction of new CPUs used in those PCs.

With spreadsheets, people struggle with multiple scenarios and with relationships because adding scenarios effectively adds a dimension to analysis, and adding relationships adds more dimensions, but spreadsheets are designed for two dimensions because their formulas refer to rows and columns, so analyzing more dimensions in a spreadsheet requires adding pages as separate tabs or separate files, and that produces redundant formulas and inputs that make a model difficult to refine and update over time.

Furthermore, even if one adds a dimension for scenarios, it will be of limited use unless it includes a scenario for each of the combinations of the scenarios for all the variables in the model, with an appropriate probability for each of those scenarios.

Probabilistic graphical models are a tool designed to support creation of such a dimension. We will review their function, as well as issues that contribute to their being used much less commonly than spreadsheets.

Probabilistic Graphical Models

A probabilistic graphical model ("PGM") is a probabilistic model for which a graph denotes the conditional dependence structure between random variables (Koller, D. & Friedman, N. (2009). Probabilistic Graphical Models: Principles and Techniques. MIT Press.) Each dependence relationship between random variables may be defined as causation ("asymmetric" or "directional"), such as in Bayesian networks and influence diagrams, or as correlation ("symmetric" or "nondirectional"), such as in Markov networks, also known as Markov random fields. PGMs are often depicted as a visualization of variables as "nodes" and relationships as "edges", which edges appear as arrows for causation relationships between nodes (as in FIG. 1) and lines for correlation relationships between nodes (as in FIG. 2).

The purpose of a PGM is to infer a joint probability distribution of scenarios for multiple variables using assertions for each variable either about scenarios for that variable or about the relationships between scenarios for that variable and scenarios for one or more other variables. This can not only help one produce a probability distribution of scenarios for any variable for which it is difficult to assert a distribution directly, but it can also help one explore the sensitivity of that distribution to other distributions that one might assert more accurately with an investment of more time and other resources. This can be useful for many applications, including prioritizing research to support decisions under uncertainty. Probabilistic inference can be very challenging computationally, and in practice graph authors must consider tradeoffs in graph design and in choice of inference methods.

A PGM may be defined by asserting for each variable either (i) Scenarios for this variable or (ii) a "Factor" describing a deterministic or probabilistic relationship between scenarios for this variable and scenarios for one or more other variables.

(i) The assertion of scenarios can be either discrete or continuous. One example of a discrete assertion is a "Probability Table" like the one in FIG. 3, within which is asserted a probability for each discrete scenario for one variable. One example of a continuous assertion is a probability function such as "P(X)=normal (mean=a, standard deviation=r)".

(ii) The assertion of factors can also be either discrete or continuous. One example of a discrete assertion is a "Conditional Probability Table" like the one in FIG. 4, within which is asserted a probability for each discrete scenario of one variable given discrete scenarios for one other variable. A Conditional Probability Table can also assert a probability for each discrete scenario of one variable given a combination of a discrete scenario for each of more than one other variable. One example of a continuous assertion is a conditional probability function such as "P(X|Y, Z)=normal (mean=a+b*Y+c*Z, standard deviation=r)".

Often, a PGM will represent multiple variables that each have different scenarios but have the same factor to other variables. To reduce the need to assert redundantly the same factor to these other variables, the PGM may combine multiple variables into one "template variable" by "indexing" the template variable along one or more "indexes" or "dimensions." For example, instead of representing the 12 variables and 4 factors in FIG. 5, the PGM may introduce "product" and "time" indexes in order to reduce the number of assertions from 12 to 9, the number of variables from 12 to 3, and the number of factors from 4 to 1, as illustrated in FIG. 6.

Variables that have a factor with template variables can "inherit" the indexes of the template variable when its scenarios are inferred from the asserted factor and scenarios in the PGM. For example, "Company B Revenue" in FIG. 6 can inherit the product and time indexes when its factor is combined with the asserted scenarios for the template variables "Company B unit sales" and "Company B ASP", so after probabilistic inference, it may get 4 values even though it has only 1 factor. Such "index inheritance" can cascade transitively through multiple variables, and a variable can get different indexes from different variables in its factor.

To define a PGM, one can use a "PGM authoring tool", 70 of which were listed by Professor Kevin Murphy at the University of British Columbia (Murphy, Kevin. (2014). Software Packages for Graphical Models. Available at http://www.cs.ubc.cal/~murphyk/Software/bnsoft.html.) These tools typically provide a graphical representation of nodes and edges, like in FIGS. 2 and 3, as well as interfaces to (i) define for each variable either scenarios or a factor to other variables, as described above, and (ii) to explore scenarios that are inferred for variables whose scenarios were not asserted explicitly. Some of these tools provide interfaces to define template variables as described above, and to utilize those template variables to perform probabilistic inference over multiple dimensions.

However, PGM authoring tools are not used nearly as commonly as spreadsheets, and that may be because all of the PGM authoring tools pose the following issues that create challenges in authoring a PGM.

Issue 1:

The tools don't provide a way to search and browse variables by their similar attributes, so when a model gets big and the nodes and arrows in FIG. 1 and FIG. 2 start looking like spaghetti, one can miss the existence of a variable and end up creating a redundant variable, not only losing the work one did on the original variable but also missing inference opportunities and creating inconsistencies.

Issue 2:

Since PGMs are garbage-in, garbage-out like any model, it can be very useful to document evidence that supports each of the assertions that define a PGM and to distinguish between assertions made with more confidence and with less confidence. But the PGM authoring tools provide little support for either. Some provide the ability to attach a "note" to each variable, but it is difficult to (i) organize detailed supporting evidence accumulated over time for each variable, and (ii) compare supporting evidence across multiple variables.

Issue 3:

One way to reduce the spaghetti in a large PGM is to enable the author to hide some variables and relationships within others and to expand those others only when ready to dig into more detail.

Some tools provide means to group variables in "modules" that hide some detail. But this approach has at least two limitations: (i) Modules are a static part of a PGM design, without a means to collapse and expand trees of variables and relationships dynamically to compare assertions across multiple variables, and (ii) each variable can only belong to one module even if it has some attributes in common with variables in multiple modules.

Issue 4:

PGM inference algorithms typically require variable identifiers that are not long and that do not have spaces, slashes, colons, apostrophes, quotation marks, and other special characters. PGM authoring tools sometimes provide users the ability to add to each variable a label that does not have these restrictions and is therefore more human-readable. However, when the tools show factors involving multiple variables, these use the identifiers instead of the labels so it is clear when each variable starts and ends, but those identifiers can make it difficult the read the factors.

Issue 5:

Template variables can reduce the spaghetti by showing only nodes and arrows for the template variables and not for all of their variations across all of their dimensions. But sometimes one would like to browse scenarios involving relationships between only some variations of various template variables, such as only those with product Desktop PC and time 2015 in FIG. 6, and these tools do not provide facile ways to do that.

Logical Graphical Models

These issues are largely related to organizing the qualitative assumptions required for people to author PGMs. Databases can help organize assumptions, so we will review opportunities and challenges in addressing these issues with the state of the art in database architectures.

Relational databases are the most commonly-used database architecture. They work well for processing transactions, using the query language SQL to organize data from columns in multiple separate tables. But organizing the assumptions in PGMs requires organizing nodes from a network of edges, which is more like Facebook's Social Graph than like a list of transactions. In a relational database architecture, this task requires "many-to-many joins", which require creating "junction tables", and it requires writing SQL queries that are recursive across these junction tables, making these queries complex to write and slow to execute.

A "graph database" is a less commonly-used but increasingly popular kind of "NoSQL" database architecture that uses a graph query language, like the World Wide Web Consortium ("W3C") standard SPARQL (Prud'hommeaux, E. & Seaborne, A. (2007). SPARQL Query Language for RDF: W3C Candidate Recommendation 14 Jun. 2007. Available at http://www.w3.org/TR/rdf-sparql-query/) or the proprietary Cypher (De Marzi, M. (2012). Cypher Query Language. Chicago Graph Database Meet-Up) or GraphQL (He, H., Singh, A. (2008). Graphs-at-a-time: query language and access methods for graph databases. Proceedings of the 2008 ACM SIGMOD international conference on management of data), to traverse edges without junction tables or recursivity, enabling queries that are simple and fast for data structured as a "graph," such as the one depicted in FIG. 7 as a visualization of nodes in black and edges in color.

The graph structure shown in FIG. 7 enables queries to traverse multiple edges in a graph to compile groups of related nodes, such as the Transactions whose product is an Electronic device. If a graph is structured more formally as a logical graphical model ("LGM"), also known as an "ontology," then it can also enable "logical inference," wherein relationship assertions, such as "Notebook PC is a PC" and "PC made with CPU," enable the system to logically infer additional relationships, such as "Notebook PC made with CPU." Then if a user changes the assertion that a computer is made with a CPU, for example, the system can automatically change the inference that a notebook PC is made with a CPU. This reduces redundant effort, which can be useful for maintaining a graph over time as the relationships between its nodes change.

Graphs may be described using the W3C standard Resource Description Framework ("RDF") terminology (Carrol, J. & Klein, G. (2004). Resource Description Framework (RDF), Concepts and Abstract Syntax: W3C Candidate Recommendation 10 Feb. 2004. Available at http://www.w3.org/TR/2004/REC-rdf-concepts-20040210/#dfn-property), referring to each link in a graph as a "triple" with three parts: a "subject" node, an "object" node, and a "predicate" edge linking the subject and object. For example, in the link "PC made with CPU" in the graph in FIG. 7, "PC" is the subject, "made with" is the predicate, and "CPU" is the object. Alternative terms for predicate include "arc", "edge", "line", "link", and others. Alternative terms for subject and object include "node", "point", "vertex", and others.

For each node in FIG. 7, an "attribute" is the predicate and object of each triple whose subject is that node, so for a node like "Company B buys $1B of CPUs from Company A in 2010" in the graph in FIG. 7, we describe its attributes as "is a Transaction", "time 2010", "seller Company A", "product CPU", "buyer Company B", and "revenue $1B". In some contexts, others describe an attribute by using the term "property".

But consistent with RDF, the term "property" is used to refer to the kind of relationship represented by each predicate. For example, the subsumption relation in set theory may be represented by a property called "is a", and the parthood relation in mereology may be represented by a property called "made with", so in the graph in FIG. 7, the two predicates in the two triples "PC made with CPU" and "Semiconductor made with Chip tester" are both instances of one property called "made with".

If one supplements a graph with a formal vocabulary, such as supplementing RDF with the W3C standard OWL 2 Web Ontology Language ("OWL 2") (Motik, B. et. al. (2009). OWL 2 Web Ontology Language Profiles: W3C Proposed Recommendation 27 Oct. 2009. Available at http://www.w3.org/TR/2009/REC-owl2-profiles-20091027/), then the graph becomes a logical graphical model ("LGM"), or an "ontology", and certain properties like the subsumption relation enable one to "infer" additional attributes without stating them in the graph. Inferred attributes are denoted by dotted arrows in the graph in FIG. 7. For example, in that graph, one can infer that "Notebook PC" has the attribute "made with CPU" because it has the attribute "is a PC" and "PC" has the attribute "made with CPU". If one uses the formal vocabulary to describe the "made with" property as "transitive", then one can traverse the graph, combining successive predicates in that property to infer that "Notebook PC" also has the attribute "made with Chip tester". And if one describes the "made with" property as "reflexive", then it will relate every node to itself, and one can infer that "Notebook PC" also has the attribute "made with Notebook PC". Like probabilistic inference, logical inference can be very challenging computationally, and in practice graph authors must consider tradeoffs in graph design and in choice of inference methods.

A "property path" may specify a combination of different properties that may connect nodes in a graph transitively across more than one triple, and in this document, we use a colon to separate properties in a property path. For example, in the graph in FIG. 7, if the property "is a" is transitive, then the property path "product:is a" connects all three Transactions as subjects to "Asset" as object. The SPARQL 1.1 graph query language supports queries across not only properties but also property paths, using a forward slash where this document uses a colon, and the meaning is the same (Harris, S. & Seaborne, A. (2013). SPARQL 1.1 Query Language: W3C Recommendation 21 Mar. 2013. Available at http://www.w3.org/TR/2013/REC-sparql11-query-20130321/#propertypaths.)

A "cardinality" of a property for a given node may describe the number of attributes that node has with that same property. In the graph in FIG. 7, the node "PC" has cardinality 2 in the "made with" property. We refer to cardinality above 1 as "higher cardinality".

The "arity" may describe the number of different nodes in a relationship. A triple describes a relationship between 2 nodes, so it has arity of 2 and can be described as a "binary relationship." But one may wish to examine a relationship between more than 2 nodes, such as between the 5 nodes "2010", "Company A", "Company B", "CPU", and "$1B" in the graph in FIG. 7, because these nodes are the objects of the attributes of "Company B buys $1B of CPUs from Company A in 2010". The relationships between more than 2 nodes may be known as "higher-arity relationships". These higher-arity relationships can be useful for making comparisons, but they are difficult to assert concisely in a visualization of nodes and edges.

To assert logical relationships in computer-readable formats like RDF or OWL, a person can use an "authoring tool", such as Protégé (available at http://protege.stanford.edu/) or the "tabular graph editor" described in U.S. patent application Ser. No. 14/203,472, among others. Such a tool can help one to assert these logical relationships and to explore both these asserted relationships and additional relationships inferred from them. But because LGMs support only logical inference and not probabilistic inference, these tools do not help one make assertions that any relationships are probabilistic—that they have some probability of each of numerous scenarios—nor to infer other probabilistic relationships from such assertions. So at present, they are not used for the purposes for which PGMs and PGM authoring tools are used.

Probabilistic Logic Networks

Some of these issues with PGM authoring tools could be addressed by some fascinating work on adding probabilistic assertions to logical graphical models, creating what some have termed "probabilistic logic networks". Some examples include Probabilistic Logic (for example described at http://en.wikipedia.org/wiki/Probabilistic_logic), Probabilistic Logic Networks (described at http://en.wikipedia.org/wiki/Probabilistic_Logic_Network), Tractable Markov Logic (described at Domingos, P. & Webb, W. (2012) A Tractable First-Order Probabilistic Logic. University of Washington), and PR-OWL (PR-OWL: A Bayesian extension to the OWL Ontology Language (http://www.pr-owl.org/).

This approach sounds promising because it can "combine the capacity of probability theory to handle uncertainty with the capacity of deductive logic to exploit structure." However, this approach requires inference that considers together both logical and probabilistic relationships, creating performance challenges that are considerably greater than the already considerable performance challenges of logical inference and probabilistic inference each on their own. As a result, these approaches remain confined to research labs, where several of them have become dormant for several years now.

BRIEF DESCRIPTION OF THE DRAWINGS

FIG. 3 illustrates an example of a probability table;

FIG. 4 illustrates an example of a conditional probability table;

FIG. 5 illustrates a PGM that does not use template variables;

FIG. 6 illustrates using template variables to make more concise the PGM in FIG. 5;

FIG. 10 illustrates an example of the creation of value subclasses to assert discrete scenarios for a variable;

FIG. 11 illustrates an example of the attributes of one of the Value subclasses from FIG. 10;

FIG. 12 illustrates an example of two subclasses of the "Index Objects" class, and their respective subclasses that represent the members of each index;

FIG. 13 illustrates an example of adding 2 indexes to a variable simultaneously;

FIG. 14 illustrates an example of the attributes of an index subclass;

FIG. 15 illustrates an example of the results of the automatic assertion of Index Attributes and the inheritance of the variable's other attributes;

FIG. 16 illustrates an example of a data representation of the system, called a "Conditionality", used to browse and edit assertions for multiple variables' scenarios and factors and to attach supporting evidence to those assertions;

FIG. 17 illustrates a process to display discrete scenarios in a Conditionality by browsing to a variable's Value Subclasses;

FIG. 18 illustrates Value Subclasses appearing in a Conditionality as a result of the process illustrated in FIG. 17;

FIG. 19 illustrates a probability table represented in a Conditionality, with discrete scenarios as column headers;

FIG. 20 illustrates a conditional probability table represented in a Conditionality, with discrete scenarios as nested row headers;

FIG. 21 illustrates the same conditional probability table as FIG. 20, but with discrete scenarios for the variable represented as column headers and discrete scenarios on which the variable is conditional represented as row headers in a Conditionality;

FIG. 22 illustrates the same conditional probability table as FIG. 21, but with a property path used in the row header of the Conditionality to make more concise the discrete scenarios on which the variable is conditional;

FIG. 23 shows two Conditionalities with assertions, respectively, for the template variables "Company B ASP" and "Company B unit sales", with different assertions for the different intersections of its indexes "product PC index objects" and "time Years from 2015 to 2016";

FIG. 24 illustrates a Conditionality with assertions for a variable that was referenced in one of the intersections of indexes in FIG. 23, and with supporting evidence for those assertions;

FIG. 25 illustrates how the system enables the user to assert a factor for a variable, such as "Company B revenue", that refers to other variables, such as "Company B unit sales" and "Company B ASP";

FIG. 26 illustrates a process in which the user employs an "Outgoing" relationship to show variables that the variable "Company B revenue" is "influenced by";

FIG. 27 illustrates a user interface showing the variables that appear as a result of the process illustrated in FIG. 26;

FIG. 28 illustrates a user interface showing variables that appear after the user employs an "Outgoing" relationship again to show variables that one of the variables that appeared in FIG. 27 is "influenced by";

FIG. 29 illustrates Value Attributes that the method asserted automatically for one Value Subclass that it created automatically for the Index Subclass "Company B revenue and product Desktop PC and time 2016", which it created automatically;

FIG. 30 illustrates a table showing the value that is in the scenario at the 50$^{th}$ percentile of the scenarios for each Index Subclass of the variable "Company B revenue";

FIG. 31 illustrates the value attribute and percentile attribute for numerous Value Subclasses representing a distribution of scenarios for 2 Index Subclasses of the Variable "Company B revenue", as well as a measure of confidence in the accuracy of each of those 2 distributions;

FIG. 32 illustrates "influenced by" relationships that the system generates automatically between Index Subclasses, enabling the user to compare scenarios for related Index Subclasses without asserting all these relationships manually;

FIG. 33 illustrates browsing through variables using three dimensions and using "influenced by" relationships, enabling comparison in a compact form of the scenarios for related issues;

FIG. 34 illustrates in a scatter plot the relationship between scenarios for Company B total revenue and scenarios for whether Company B buys CPUs from Company A.

DETAILED DESCRIPTION OF ONE OR MORE EMBODIMENTS

The system and method does not use inference that considers both logic and probability together, but uses logical inference separately to help a user create, edit, and browse the assertions and inferences in a probabilistic graphical model, which can then drive probabilistic inference using existing algorithms that are already proven at scale in actual practice. This approach requires numerous innovations in user interfaces and algorithms as described below.

The disclosure is particularly applicable to a cloud based system and method as described below that includes a "PGM authoring tool" that enables a user to employ a logical graphical model to create, edit, and browse the assertions and inferences in a probabilistic graphical model. It is in this context that the system and method will be described. It will be appreciated, however, that the system and method has greater utility in a large number of applications that involve employing a logical graphical model to create, edit, and browse the assertions and inferences in a probabilistic graphical model, and its delivery stack can be modified for different computing environments, including, among other differences, different graph databases, and different PGM representations and inference engines.

Figure 35:
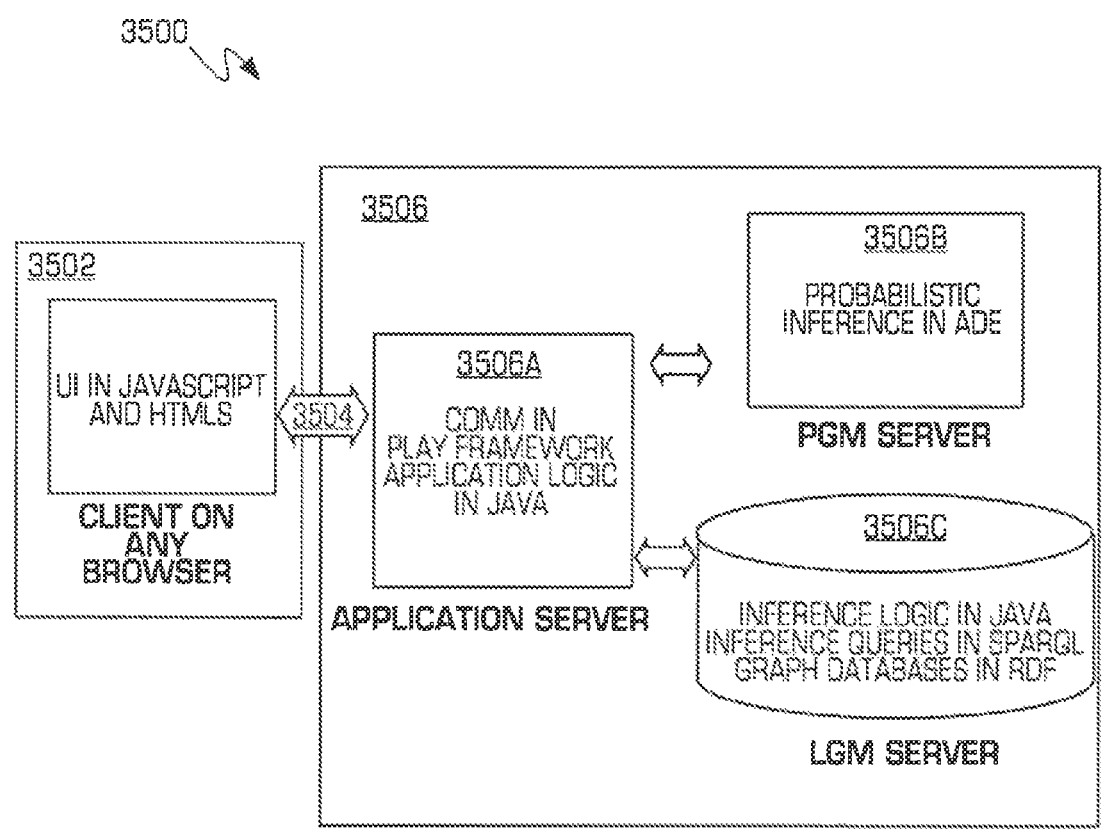
FIG. 35 illustrates an example of a computer system implementation of a system that uses a logical graphical model to create, edit, and browse the assertions and inferences in a probabilistic graphical model.

FIG. 35 illustrates an example of a computer system implementation of a system 3500 that provides a "PGM authoring tool" that enables a user to employ a logical graphical model to create, edit, and browse the assertions and inferences in a probabilistic graphical model. The implementation of the system 3500 in FIG. 35 may have one or more front end components 3502 (only one is shown in FIG. 35 for clarity) that connect to and couple over a communications path 3504 with a backend component 3506 wherein the backend component may interact with each front end component to provide the "PGM authoring tool" that enables a user of each front end component to employ a logical graphical model to create, edit, and browse the assertions and inferences in a probabilistic graphical model.

Each front end component 3502 may be a computing device that has at least one processor, memory such as DRAM or SRAM of flash, persistent storage such as a hard disk drive, other storage devices or flash storage, input/output devices that allow a user to interact with the computing device, a display and connectivity circuits and software that allow the computing device to connect to the communications path 3504 and the backend component 3506. For example, each computing device may be a smartphone device such as an Apple iPhone or Android operating system based device, a personal computer, a tablet computer, a terminal, a laptop computer and the like. In some embodiments, each computing device may execute a browser application or other application to facilitate the interactions with the backend component 3506. When such an application is used, the computing device and the backend component may communicate and exchange data using HTML or other known data protocols. In one embodiment, the user interface of the system that is displayed to the user may be implemented using Javascript and HTML5 as shown in FIG. 35.

The communications path 3504 may be a wired or wireless (or a combination thereof) network or system for communicating data. For example, the communications path 3504 may be a cellular network, a digital data network, Ethernet, a wireless digital data network, a Wifi network or any other communications path that uses a communications protocol and data transfer protocol. For example, in one embodiment, the protocol may be TCP/IP and the data transfer protocol may be HTTP or HTTPS. The communications path 3504 may use other protocols, such as REST and the like.

The backend component 3506 may be implemented using one or more computing resources in which the computing resources may be a server computer, an application server, a database server, a cloud computing element and the like. The one or more computing resources used to implement the backend component 3506 may include at least one processor, memory, a persistent storage device and connectivity circuits.

The backend component 3506 may further comprise an application component 3506A, that may be implemented in one embodiment in an application server as shown in FIG. 35, that manages the communication and data exchange with each front end component 3502. In one embodiment, the application component 3506A may use Play Network for communications and have application logic in Java. The backend component 3506 may further comprise a probabilistic graphical model (PGM) component 3506B and a logical graphical model (LGM) component 3506C that both exchange data with the application component 3506A. In one embodiment, each of the PGM component 3506B and the LGM component 3506C may be implemented on a server computer and the server computer may be separate server computers or the same server computer. The PGM component 3506B may perform probabilistic graphical model functions and operations of the system as described below and may be implemented using ADE. The LGM component 3506C may perform logical graphical modeling functions and operations of the system as described below and may be implemented using Java for the inference logic, SPARQL for the inference queries and RDF for the graph database as shown in FIG. 35.

Each of the application component 3506A, PGM component 3506B and LGM component 3506C may be implemented in hardware or software. When each component is implemented in hardware, each component may be implemented using the circuitry as described below. When each component is implemented in software, each component may be a plurality of lines of computer code/instructions that are stored in a memory (or downloaded to a memory) and then executed by a processor of the computing resources, such as a processor of a server computer, so that the processor executes the code and is configured to perform the operations and functions of each component as described below.

In a preferred embodiment, the system shown in FIG. 35 may utilize the W3C standard RDF structure and OWL 2 EL profile for LGMs and the Bayesian network representation for PGMs, but it will appreciated that the system and method has utility in any graph structure, including in directed graphs, undirected graphs, simple graphs, multigraphs, hypergraphs, property graphs, Bayesian networks, Markov networks, and others.

The following describes how to utilize the system and method to build one embodiment. The description assumes that the builder is versed in the art of graph database development and is conversant in some graph query language like SPARQL and in some formal vocabulary like OWL 2 EL profile which are known to those skilled in the art. The description assumes further that the builder is versed in the art of web application development and is conversant in some procedural programming language like Java and in some hypertext markup and scripting languages and libraries, such as HTML5, Javascript, and the Sencha Ext JS framework for Javascript which are known to those skilled in the art. Some of the description relies on the disclosure in commonly owned U.S. patent application Ser. No. 14/203,472 (incorporated herein by reference) that describes inserting and editing with higher arity and cardinality and with property paths.

Figure 1:
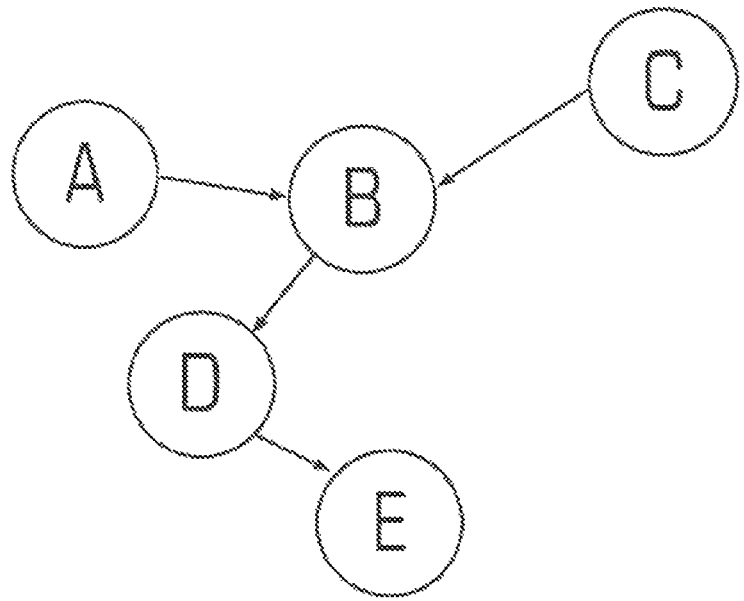
FIG. 1 illustrates an example of a directed Probabilistic Graphical Model ("PGM")
Figure 2:
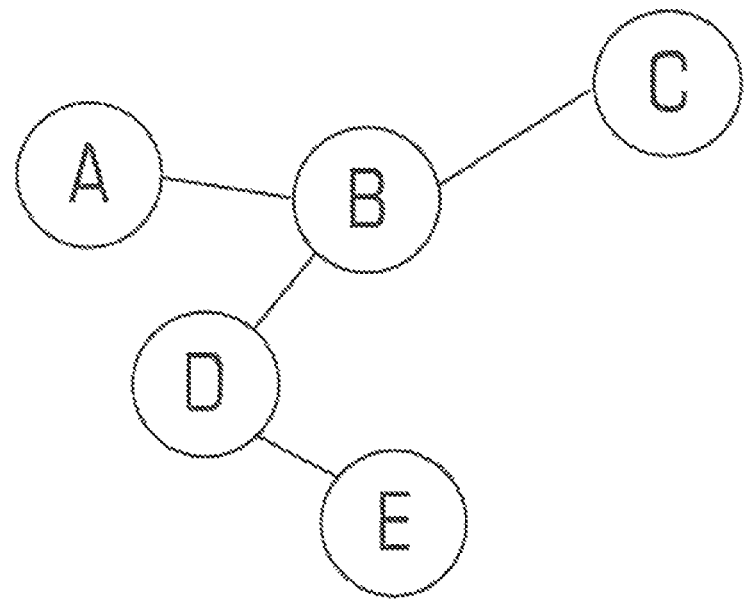
FIG. 2 illustrates an examples of an undirected PGM.
Figure 7:
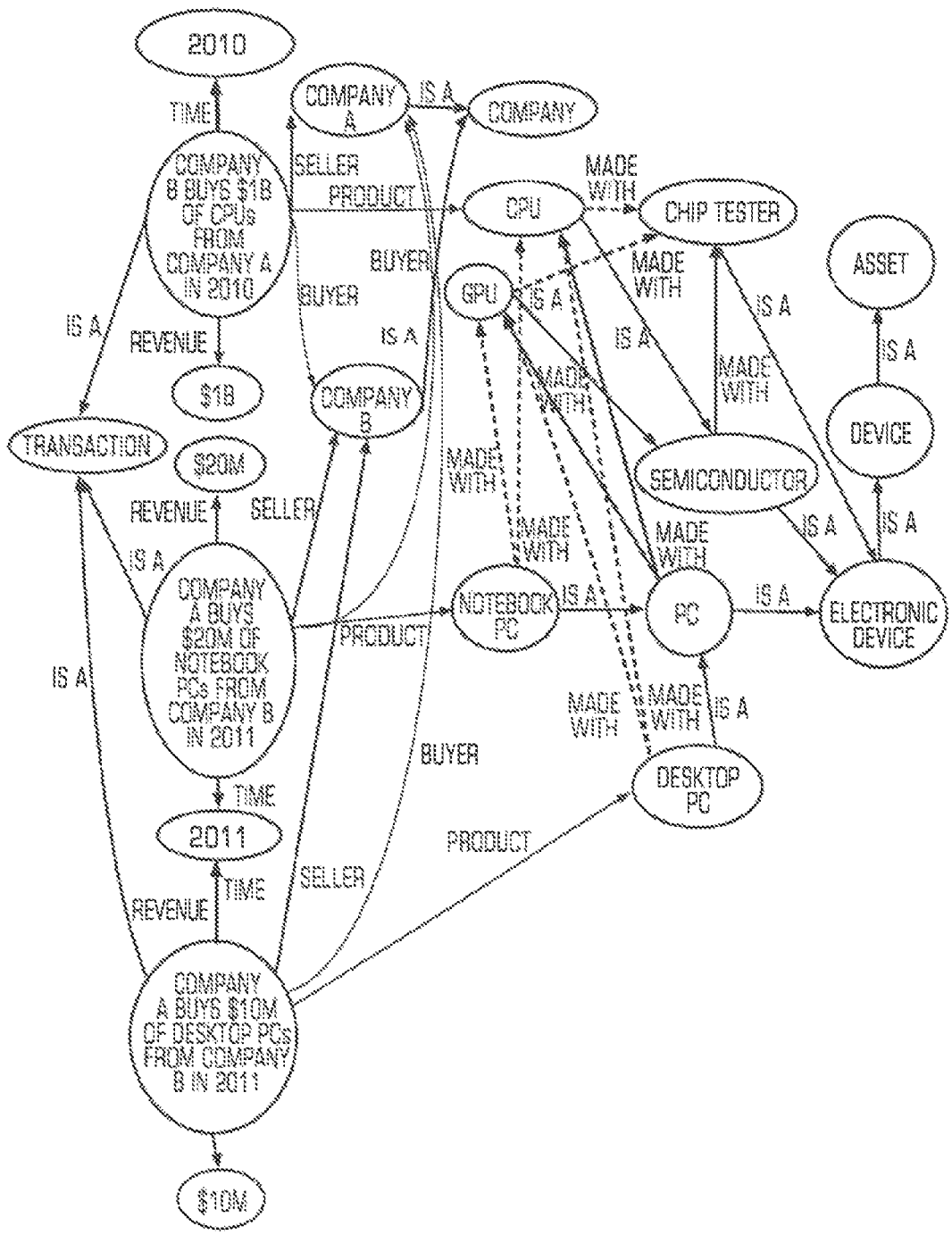
FIG. 7 illustrates an example of a Logical Graphical Model ("LGM")
Figure 8A:
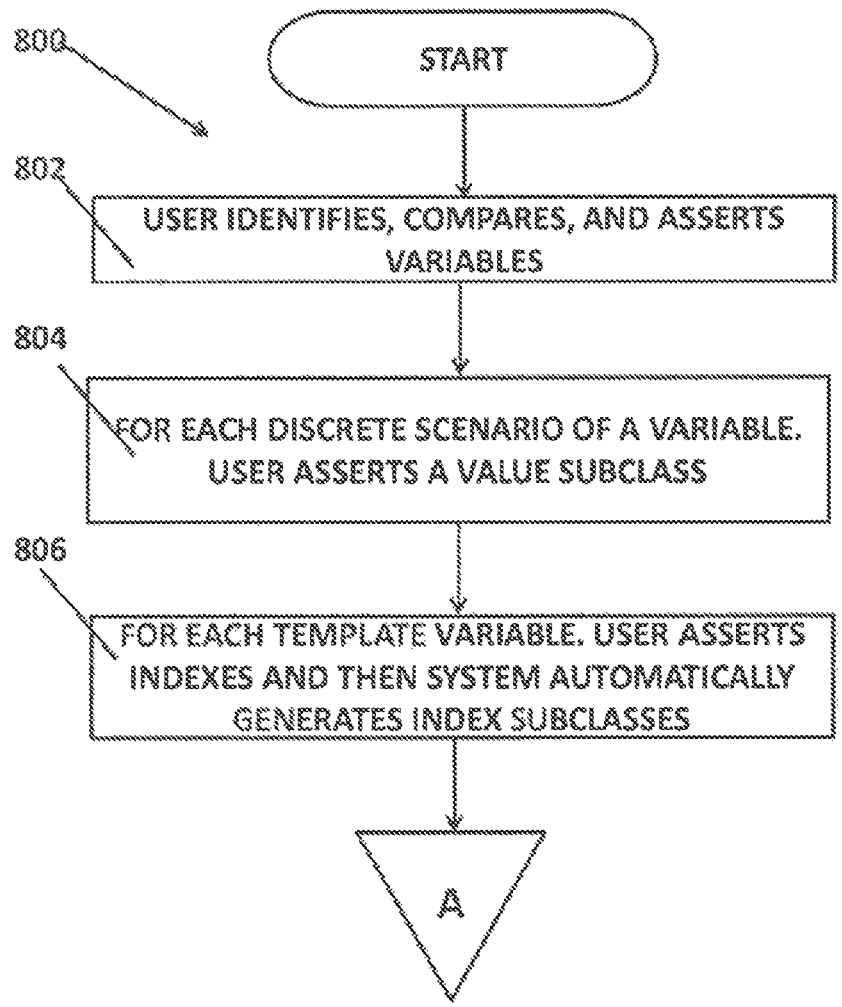
FIGS. 8A and 8B illustrate a method for authoring a PGM using the system.
Figure 8B:
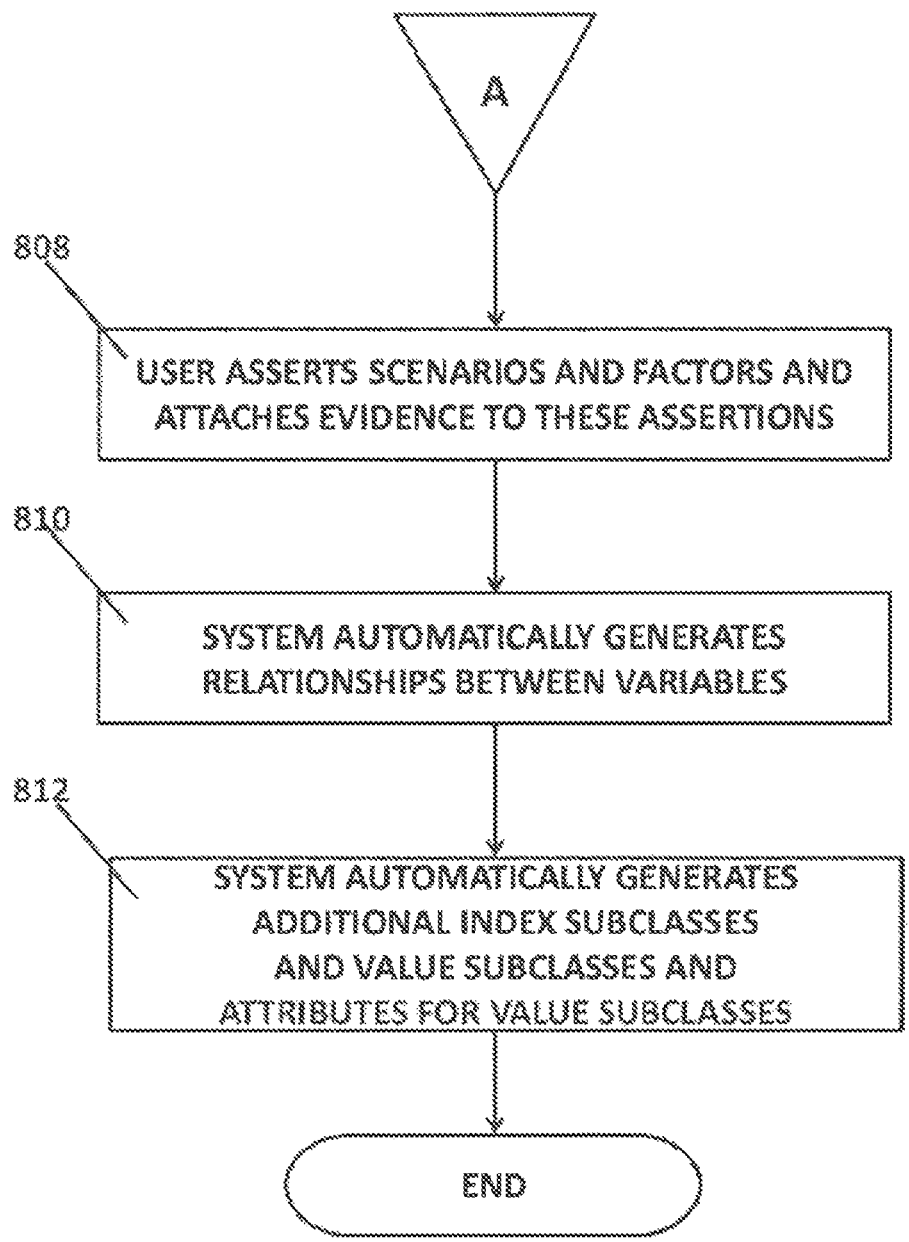

FIGS. 8A and 8B illustrate a method 800 for authoring a PGM using the system. To author a PGM, the user of the system may follow the six steps described below. The user may often follow this sequence of steps but may also perform steps in a different sequence and may often repeat steps iteratively while browsing and editing. The method shown in FIGS. 8A and 8B may be implemented by the system 3500 and in particular by the application component 3506A of the system and may be implemented using the application logic shown in FIG. 35. To illustrate this method, the description below will refer back to an example of the logical graph model shown in FIG. 7 and its characteristics.

Figure 9:
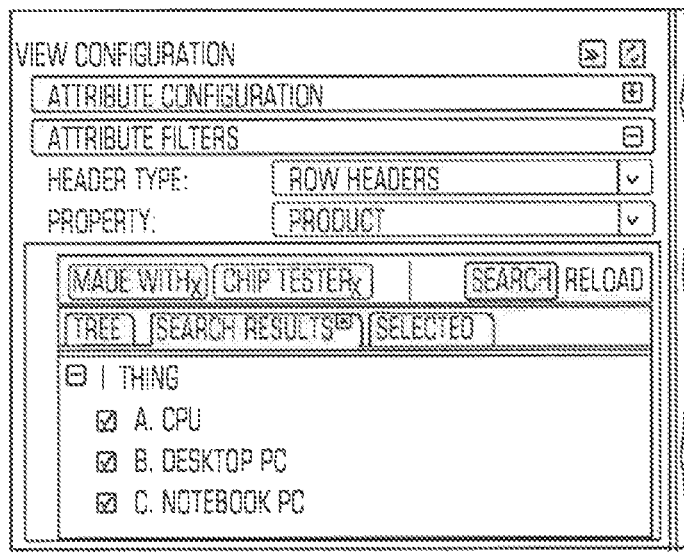
FIG. 9 illustrates a process for identifying and comparing variables.

In the method, the system allows the user to identify and compare variables (802) in a model. For example, the system helps the user compare related variables and avoid creating redundant variables which addresses Issue 1 described above. The system may represent variables as classes with attributes that the user can use to group variables about similar issues. The system may also provide special treatment of all classes for which the user asserts the superclass "Variable". This superclass could have any other label that signifies a variable in a PGM. FIG. 9 illustrates this process. Note that in this table, and in all subsequent tables, subjects of triples are shown under a capitalized header, like "Variable", that represents the superclass of those subjects, and attributes of each subject are shown by the objects under non-capitalized headers that represent their predicates, such as "product", "seller", "buyer", and "time". If no capitalized header is shown in the table, then subjects of triples are not shown but do exist, since all triples always have a subject, a predicate, and an object.

Returning to FIGS. 8A and 8B, the method may then, for each variable, generate/represent a subclass (a "Value Subclass") of that variable for each of its scenarios (804). A deterministic variable will have one Value Subclass, and a probabilistic variable will have more than one Value Subclass. These Value Subclasses may be known as "instances" (also known as "individuals" in ontology languages like OWL 2).

As shown in the example in FIG. 10, the user may create Value Subclasses to assert discrete scenarios for a variable, such as "Company B signs large deal to buy CPUs from Company A in 2015?" in the example in FIG. 10. Each Value Subclass uses one attribute to describe the value of each scenario. This attribute is labeled "value", as seen in the last column in FIG. 10, but like any other attribute or class, it could have another label without changing its meaning or how it is used.

Each Value Subclass can inherit the attributes of the variable via logical inference, as shown in FIG. 11, which shows attributes of one of the Value subclasses from FIG. 10, with a red "-" to the right of the attributes that were asserted (the top two attributes in FIG. 11) and therefore can be deleted directly by the user, and with a blue "i" to the right of the attributes (the other attributes in the example in FIG. 11) that were inferred from its superclass and therefore cannot be deleted directly by the user.

After probabilistic inference is conducted on the PGM, the method may assert automatically some Value Subclasses for each probabilistic variable. The method also may assert automatically, for each asserted and each inferred Value Subclass, some other attributes, such as, among others, (i) its percentile in a cumulative probability distribution, (ii) its bin in a probability density function, (iii) its sample number among a series of samples; or (iv) whether its value is a statistical summary measure for the variable's scenarios, such as min, max, mean, skew, and kurtosis. These automatic assertions will be made with the "context" that they are a "Result" of probabilistic inference, and the system and method will use that context to change these "Value Attributes" automatically whenever the results of probabilistic inference change. The Value Attributes are described in more detail later after a description of how to make assertions that drive probabilistic inference.

Returning to FIGS. 8A and 8B, the method may, for each variable, allow the user to create a subclass (an "Index Subclass") of that variable (806) for each intersection of the members of the indexes by which the user would like to index the variable. The method represents each index as an attribute, with (i) a predicate and (ii) an object that is a class whose subclasses comprise the set of objects for the index's predicate. To designate such an object (ii), the user must assert that it is a subclass of a special class that we have labeled "Index Objects" but that can labeled with any term that users desire. FIG. 12 illustrates an example of two of these subclasses of "Index Objects" and their respective subclasses that represent the members of each index.

The user may use two methods to add indexes to a variable. First, in a table, the user may enter under any property a subclass of "Index Objects", and because it is a subclass of "Index Objects", the system and method will automatically find or create an index based on the attribute comprised of (i) that property as predicate and (ii) that subclass of "Index Objects" as object, and it will automatically create Index Subclasses of the variable, each of which has an attribute comprised of (i) that property as predicate and (ii) a subclass of the subclass of "Index Objects" as object. In the example in FIG. 13 of the indexing, the user enters under the property "product" the Index Objects subclass "PC index objects" and enters under the property "time" the Index Objects subclass "Years from 2015 to 2016", simultaneously indexing the variable "Company B unit sales" by two indexes that the system and method creates automatically, "product PC index objects" and "time Years from 2015 to 2016".

Second, the user may select a variable and click a button to add an index to that variable, and then the user may select for that index a property and a subclass of Index Objects. This can be a convenient way to add indexes to a variable that already has at least one index.

When the user adds indexes to a variable using either method, then the method automatically creates an Index Subclass for each combination of the objects of all its indexes, and to each of these Index Subclasses it asserts "Index Attributes" with the appropriate properties and index objects, as well as asserting for the Index Subclass a label that starts with the variable name, followed by "and" before each of the Index Attributes to denote that the Index Subclass is the subclass of the variable that is defined by the conjunction of these Index Attributes.

FIG. 14 illustrates an example of an index subclass. In that figure, note that the assertions of the Index Attributes have "Index" displayed on the right, which is because they are asserted with the "context" that they are Index Attributes so the method can use that context to change these assertions automatically whenever the user performs an operation on the indexes involved. Also note that each Index Subclass can inherit the attributes of the variable via logical inference. FIG. 14 illustrates that this Index Subclass has inherited the attribute "seller Company B".

As a result of the automatic assertion of Index Attributes and the inheritance of the variable's other attributes, the user will find each Index Subclass alongside any similar Index Subclasses or similar variables when he browses along any of their attributes, as illustrated in FIG. 15. This can help the user reuse and connect related variables to design a PGM more effectively, addressing Issue 1. Each Index Subclass will in turn have Value Subclasses describing scenarios for that Index Subclass. These Value Subclasses may either be asserted by the user, as described above in process 804, or inferred after probabilistic inference is performed, as described below in process 812.

Returning to FIGS. 8A and 8B, the method may then help a user to assert scenarios and factors as well as attach supporting evidence to these assertions (808). The method and system provides a representation that we call a "Conditionality", as shown in FIG. 16. This representation helps the user address Issue 2 by using a subclass of the class "Conditionality" as subject and then enabling a user to assert attributes of that Conditionality. For example, the attributes may be which variables it describes "scenarios" for, which other variables' scenarios each of those is "conditional on" (if any), what "judgment" the user makes about those scenarios and their relationships (if any) to scenarios for other variables, what "incremental confidence" the user has in each judgment, what "supporting evidence" the user has collected to support each judgment and reinforce his confidence in that judgment, and what attributes in turn that supporting evidence possesses, such as its "author" and a "link" to open web pages or files with further details on the supporting evidence.

As shown in FIG. 17, the user can right-click on a variable in the "scenarios" attribute and add rows that are related to that variable, either with that variable as subject of "Outgoing" attributes or as object of "Incoming" attributes. In FIG. 17, the user adds rows with the Incoming attribute "is a" in order to show the Value Subclasses that we asserted for the variable "Company B signs large deal to buy CPUs from Company A in 2015?"

In FIG. 18, the user interface shows those Value Subclasses added and shows some attributes of the Conditionalities involving those Value Subclasses, which the user asserted in order to assert the Probability Table from FIG. 3, to rate the user's confidence in those assertions, and to support those assertions with some evidence. When the user asserts a "judgment" attribute for a Conditionality involving a Value Subclass and nothing in a "conditional on" attribute for that Conditionality, then that judgment represents an assertion of the probability of the scenario represented by that Value Subclass. That same Probability Table assertion can also be represented more traditionally as a table, seen in FIG. 19, using property paths to denote the attributes of the object of the Conditionality's "scenarios" attribute.

The system and method enables the user to assert the Conditional Probability Table in FIG. 4 and also describe confidence in those assertions and support them with evidence by asserting it in a Conditionality, as illustrated in FIG. 20. When the user asserts a "judgment" attribute for a Conditionality involving a Value Subclass and some scenarios of other variables in a "conditional on" attribute for that Conditionality, then that judgment represents an assertion of the probability of the scenario represented by each Value Subclass in the "scenarios" attribute conditional on the scenario represented by each Value Subclass in the "conditional on" attribute of the same Conditionality. While it is not illustrated here, a Conditionality can have "higher arity" in the "conditional on" property in order to represent probabilities of scenarios for one variable conditional on scenarios for more than one other variable. Those same Conditional Probability Table assertions can also be represented more traditionally as a table, seen in FIG. 21 and FIG. 22, using property paths to denote the attributes of the object of the Conditionality's "scenarios" attribute and "conditional on" attribute or attributes.

The system and method enables a user to also use a table with property paths to make assertions for the scenarios and factors of the various intersections of the indexes of a template variable. For example, FIG. 23 shows two tables with assertions, respectively, for the template variables "Company B ASP" and "Company B unit sales", with different assertions for the different intersections of its indexes "product PC index objects" and "time Years from 2015 to 2016". Note two things about FIG. 23:
  (i) When the object of a Conditionality's "scenarios" attribute is not a Value Subclass but instead a variable or an Index Subclass, then the object of its "judgment" attribute represents not a probability but instead a value for a deterministic variable or Index Subclass or values of scenarios for a probabilistic variable or Index Subclass. For three of the four Index Subclasses in the second table, the user asserted a normal distribution function, which is a probabilistic assertion.
  (ii) For the fourth Index Subclass in the second table, the user asserted a formula that references another variable called "Desktop sales after Company A deal go or no-go".

FIG. 24 illustrates how the system and method enables the user to employ a Conditionality to make the assertion for that other variable, "Desktop sales after Company A deal go or no-go", to describe his confidence in it, and to support it with evidence. One may recognize that these assertions comprise a Conditional Probability Table for this variable.

FIG. 25 illustrates how the system and method enables the user to assert a factor for a variable, such as "Company B revenue", that refers to other variables, such as "Company B unit sales" and "Company B ASP". The system and method addresses Issue 4 by displaying assertions about factors to other variables not with just computer-readable variable names but instead with human-readable labels that are each underlined so one can distinguish where each variable label starts and ends even if the label is long and has spaces, slashes, colons, apostrophes, quotation marks, and other special characters.

Returning to FIGS. 8A and 8B, the method may then automatically generate relationships between variables using the transitive properties "influences" and "influenced by" (810). When Variable X appears in the "scenario" attribute of a Conditionality, and Variable Y appears in the "judgment" attribute of that Conditionality, or any of Variable Y's Value Subclasses appear in a "conditional" attribute of that Conditionality, then the method will automatically create the triples "Variable X influenced by Variable Y" and "Variable Y influences Variable X". These attributes are asserted with "Auto" context, and the system and method uses that context to change these assertions automatically as required when assertions in Conditionalities change. The user can also assert directly "influences" and "influenced by" relationships between variables. These direct assertions will not have "Auto" context, and the method will not change them automatically.

These "influences" and "influenced by" relationships enable the user to employ the browsing functionality previously illustrated in FIG. 17 not only to expand variables to reveal their Index Subclasses and Value Subclasses, but also to reveal other variables that they influence or are influenced by.

Figures 26, 27:
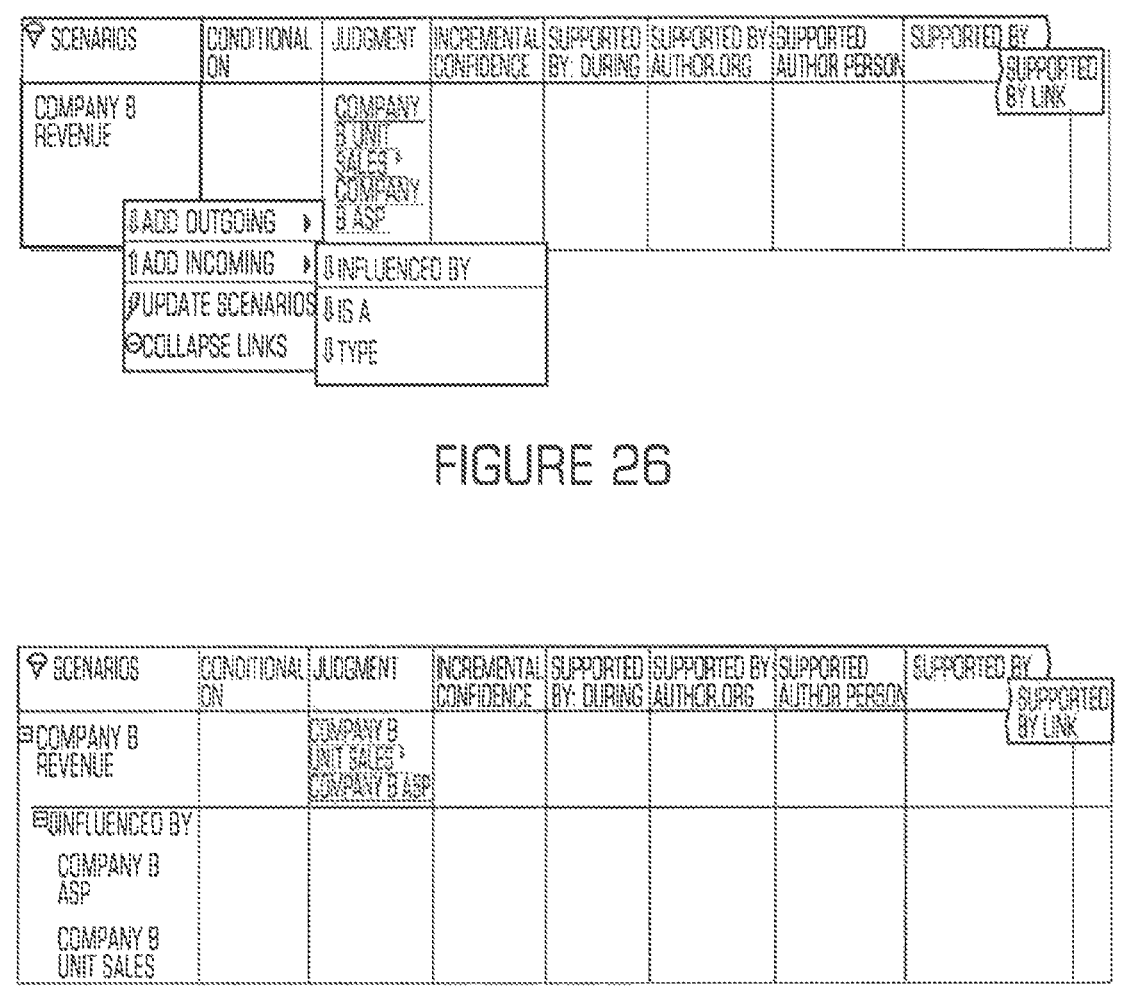

FIG. 26 illustrates the user expanding the variable "Company B revenue" by its "Outgoing influenced by" relationships to reveal the variables that it is influenced by, as seen in FIG. 27.

FIG. 28 illustrates the results of expanding one of those in turn by its "Outgoing influenced by" relationships to reveal the variables that it is influenced by and then also revealing those that one of them is influenced by in turn, and so on, until reaching the final variable and expanding by its "Incoming is a" relationships to show the Conditionalities for its Value Subclasses. This browsing functionality addresses Issue 3 by enabling the user not only to view one variable's relationships to other variables myopically, but also to compare many variables' relationships to each other in one visualization in order to grasp the bigger picture. Or course, since the user is comparing these variables within the Conditionality architecture, he can compare not only the judgments for these variables but also his confidence in those various judgments and his supporting evidence for them.

Returning to FIGS. 8A and 8B, the method, when probabilistic inference is conducted on the PGM, automatically generates additional Index Subclasses for each variable to capture each combination of the elements of all the indexes in the variables that it is influenced by (812). For example, the user did not index the variable "Company B revenue," but he defined its value as "Company B ASP*Company B unit sales", and those two variables were each indexed by "product PC index objects" and "time Years from 2015 to 2016", so the system automatically creates the corresponding Index Subclasses for "Company B revenue" to hold the results of that multiplication.

Also after probabilistic inference is conducted, the method asserts the results of that inference by generating new Value Subclasses of variables or of Index Subclasses for any inferred values that the user did not assert already, and by asserting for each Value Subclass additional Value Attributes, such as, among others, (i) its percentile in a cumulative probability distribution, (ii) its bin in a probability density function, (iii) its sample number among a series of samples, and (iv) whether its value is a statistical summary measure for the variable's scenarios, such as min, max, mean, skew, and kurtosis. These automatic assertions will be made with the "context" that they are a "Result" of probabilistic inference, and the system and method will use that context to change these Value Attributes automatically whenever the results of probabilistic inference change.

FIG. 29 illustrates Value Attributes that the system and method asserted automatically for one Value Subclass that it created automatically for the Index Subclass "Company B revenue and product Desktop PC and time 2016", which it created automatically. The attributes of Value Subclasses enable the user to view the values resulting from inference in numerous formats, such as the one in FIG. 30, which illustrates a table showing the value that is in the scenario at the $50^{th}$ percentile of the scenarios for each Index Subclass of the variable "Company B revenue".

If the user desires to view a broader distribution of scenarios for an Index Subclass, then he can view its Value Subclasses' Value Attributes in a format like the one in FIG. 31, which illustrates the values for scenarios at several different percentiles for two of those Index Subclasses, the one representing "Company B revenue and product Desktop PC and time 2015" and the one representing "Company B revenue and product Desktop PC and time 2016". Note that FIG. 31 also displays a "confidence" for each Index Subclass. The method calculates this "confidence" as the product of the "incremental confidence" that the user asserted for the Index Subclass itself and for each of the variables or Index Subclasses that each of these Index Subclasses are influenced by transitively. The method provides the user the ability to assert a "default incremental confidence" that the method applies as the "incremental confidence" for any variable or Index Subclass for which the user did not assert an incremental confidence directly.

In addition, after probabilistic inference is conducted, the method automatically "wires together" Index Subclasses with "influences" and "influenced by" relationships based on similar relationships between the variables that are superclasses of these Index Subclasses and based on the Index Attributes of these Index Subclasses. In particular, for each pair of variables that are connected with "influences" and "influenced by" relationships like those shown in FIG. 27, after probabilistic inference the method asserts additional "influences" and "influenced by" relationships between those variables' respective Index Subclasses that have the most Index Attribute objects in common. These attributes are asserted with "Wire" context, and the system and method uses that context to change these relationships as necessary whenever probabilistic inference is conducted again.

As an example, after probabilistic inference, the method asserts for the Index Subclass "Company B revenue and product Desktop PC and time 2015" the attribute "influenced by Company B ASP and product Desktop PC and time 2015", because (i) "Company B revenue" has the attribute "influenced by Company B ASP", and (ii) these two Index Subclasses both had the Index Attributes "product Desktop PC" and "time 2015", and no other Index Subclasses of the two variables had more Index Attributes in common.

These relationships enable the user to address Issue 5 by browsing scenarios for Index Subclasses and comparing them to other Index Subclasses that they influence and are influenced by, as shown in FIG. 32. For example, this enables the user to compare scenarios for "Company B revenue and product Desktop PC and time 2016" side-by-side with scenarios for "Desktop sales after Company A deal go or no-go", because it is "influenced by" them. On the other hand, scenarios for the other Index Subclass "Company B revenue and product Desktop PC and time 2015" are not influenced by "Desktop sales after Company A deal go or no-go", so this variable is not connected to this other Index Subclass and does not confuse the story of its influences.

In FIG. 32, note that "Company B revenue and product Desktop PC and time 2016" is connected directly to "Desktop sales after Company A deal go or no-go" even though the latter was asserted in a judgment for the other variable "Company B unit sales and product Desktop PC and time 2016", which in turn was asserted in a judgment for the former. The system and method skips over variables whose judgment includes only one other variable, opting instead to make connections directly to the variable in that judgment in order to remove redundancy.

FIG. 33 expands the analysis from FIG. 32 to illustrate that the system and method makes thorough scenario analysis more practical that it is with uncommonly-used PGM authoring tools and with commonly-used spreadsheets. Here, the user explores scenarios for future revenue of Company B, influenced by scenarios for revenue of the company's products, influenced in turn by scenarios for a deal for Company B to buy desktop CPUs from Company A, which were driven by the user's judgments, which were in turn supported by the qualitative research that the user organized with the system and method. In FIG. 34, we see furthermore that the user can explore how scenarios for one variable are related to scenarios for another variable in order to prioritize further research and analysis.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for analyzing a probabilistic graphical model having one or more assertions and one or more inferences, comprising:
    providing a back-end server having a processor and a memory that is configured to:
        retrieve a logical graph model, the logical graph model having one or more variables wherein each variable has a variable name and is represented as a logical class with attributes, wherein the logical graph model includes variables of the probabilistic graphical model, wherein each assertion describes a probabilistic relationship between a scenario and a variable, wherein each inference is one of a probabilistic inference derived from the probabilistic graphical model and a logical inference derived from the logical graph model and wherein the logical inference is derived from a particular variable and its attributes;
        generate, for each variable of the logical graph model, one or more index subclasses, each index subclass having at least one attribute comprised of a property and an object that is a subclass of an index object class;
        create additional index subclasses for the one or more variables of the logical graph model, wherein the additional index subclasses of the one or more variables are influenced by additional index subclasses of one or more other variables in the probabilistic graphical model;
        automatically label each index subclass of the logical graph model with a logical conjunction that represents an index element in each of its index subclasses; and
    employing, using a front end computing device that interacts with the backend server, the generated one or more index subclasses and additional index subclasses of the logical graph model to one of create, edit and browse the one or more assertions and the one or more inferences of the probabilistic graphical model.

2. The method of claim 1, wherein the back-end server is further configured to automatically label each index subclass using the variable name for the index subclass and the attributes of the index subclass.

3. The method of claim 1, wherein the back-end server is further configured to assert at least one scenario for at least one variable of the logical graph model by attaching evidence to the at least one scenario for the variable.

4. The method of claim 3, wherein the back-end server is further configured to generate a value subclass for each variable for each scenario further by inheriting one or more attributes of the variable using logical inference.

5. The method of claim 1, wherein the back-end server is further configured to generate a confidence for each index subclass.

6. The method of claim 5, wherein the back-end server is further configured to combine an incremental confidence of the index subclass and the confidence for each of the other index subclasses that the index subclass is influenced by transitively.

7. The method of claim 1, wherein the back-end server is further configured to automatically wire together the index subclasses to each other using edges with labels.

8. The method of claim 1, wherein the back-end server is further configured to automatically assert value subclasses for each index subclass to represent scenarios for the index subclass generated by probabilistic inference and automatically assert one or more attributes for the value subclasses.

9. The method of claim 8, wherein the one or more attributes for the value subclasses are one of a percentile in a cumulative probability distribution, a bin in a probability density function, a sample number among a series of samples, or whether its value is a statistical summary measure for the at least one scenario for the variable including min, max, mean, skew, and kurtosis.

10. A system for analyzing a probabilistic graphical model having one or more assertions and one or more inferences, comprising:
    a store that stores a plurality of graphs including a logical graph model, the logical graph model having one or more variables wherein each variable has a variable name and an attribute, wherein the logical graph model includes variables of the probabilistic graphical model;
    a backend server having a processor and a memory that are configured to:
        retrieve the logical graph model, the logical graph model having the one or more variables wherein each variable is represented as a logical class with attributes, wherein the logical graph model includes the variables of a probabilistic graphical model, wherein each assertion describes a probabilistic relationship between a scenario and a variable, wherein each inference is one of a probabilistic inference derived from the probabilistic graphical model and a logical inference derived from the logical graph model and wherein the logical inference is derived from a particular variable and its attributes;
        generate, for each variable of the logical graph model, one or more index subclasses, each index subclass having at least one attribute comprised of a property and an object that is a subclass of an index object class;
        create additional index subclasses for one or more variables of the logical graph model, wherein the additional index subclasses of the one or more variables are influenced by additional index subclasses of one or more other variables in the probabilistic graphical model; and
        automatically label each index subclass of the logical graph model with a logical conjunction that represents an index element in each of its index subclasses; and
    one or more computing device connectable to the backend server that permit a user to employ the generated one or more index subclasses and additional index subclasses of the logical graph model to one of create, edit and browse the one or more assertions and the one or more inferences of the probabilistic graphical model.

11. The system of claim 10, wherein the back-end server is further configured to automatically label each index subclass using the variable name for the index subclass and the attributes of the index subclass.

12. The system of claim 10, wherein the back-end server is further configured to assert at least one scenario for at least one variable of the logical graph model by attaching evidence to the at least one scenario for the variable.

13. The system of claim 12, wherein the back-end server is further configured to generate a value subclass for each variable for each scenario further by inheriting one or more attributes of the variable using logical inference.

14. The system of claim 10, wherein the back-end server is further configured to generate a confidence for each index subclass.

15. The system of claim 14, wherein the back-end server is further configured to combine an incremental confidence of the index subclass and the confidence for each of the other index subclasses that the index subclass is influenced by transitively.

16. The system of claim 10, wherein the back-end server is further configured to automatically wire together the index subclasses to each other using edges with labels.

17. The system of claim 10, wherein the back-end server is further configured to automatically assert value subclasses for each index subclass to represent scenarios for the index subclass generated by probabilistic inference and automatically assert one or more attributes for the value subclasses.

18. The system of claim 17, wherein the one or more attributes for the value subclasses are one of a percentile in a cumulative probability distribution, a bin in a probability density function, a sample number among a series of samples, or whether its value is a statistical summary measure for the at least one scenario for the variable including min, max, mean, skew, and kurtosis.

* * * * *